United States Patent
Chung et al.

(10) Patent No.: US 8,811,350 B2
(45) Date of Patent: Aug. 19, 2014

(54) HANDOVER PERFORMED IN CONSIDERATION OF UPLINK/DOWNLINK COMPONENT CARRIER SETUP

(75) Inventors: Jae Hoon Chung, Anyang-si (KR); Yeong Hyeon Kwon, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/256,200

(22) PCT Filed: Mar. 15, 2010

(86) PCT No.: PCT/KR2010/001587
§ 371 (c)(1),
(2), (4) Date: Sep. 12, 2011

(87) PCT Pub. No.: WO2010/104365
PCT Pub. Date: Sep. 16, 2010

(65) Prior Publication Data
US 2012/0002643 A1 Jan. 5, 2012

Related U.S. Application Data

(60) Provisional application No. 61/265,728, filed on Dec. 1, 2009, provisional application No. 61/159,862, filed on Mar. 13, 2009.

(51) Int. Cl.
*H04W 36/30* (2009.01)
*H04L 5/14* (2006.01)

(52) U.S. Cl.
USPC ............................ 370/332; 455/436; 370/280

(58) Field of Classification Search
CPC .................... H04W 36/0072; H04W 36/0088; H04W 36/30; H04W 36/005
USPC ......... 370/330, 331, 328, 329, 468, 332, 333, 370/341, 431, 432, 426, 278, 276, 277, 280, 370/281, 294, 295; 455/436–438, 439, 442, 455/450, 452, 524, 525, 68, 69, 134, 135
See application file for complete search history.

(56) References Cited

U.S. PATENT DOCUMENTS 8,218,500 B2 * 7/2012 Kangude et al. ............. 370/331
8,305,964 B2 * 11/2012 Fischer et al. ............... 370/328

(Continued)

FOREIGN PATENT DOCUMENTS

CN 101064943 10/2007
KR 10-2008-0073439 8/2008

(Continued)

OTHER PUBLICATIONS

State Intellectual Property Office of the People's Republic of China Application Serial No. 201080018907.0, Office Action dated Oct. 10, 2013, 7 pages.

*Primary Examiner* — Hanh N Nguyen
(74) *Attorney, Agent, or Firm* — Lee, Hong, Degerman, Kang & Waimey

(57) ABSTRACT

The present invention relates to a wireless communication system which supports carrier aggregation. More particularly, the present invention relates to a method and to an apparatus for enabling a user equipment to perform a handover in a wireless communication system which supports carrier aggregation. The method for performing a handover comprises the steps of: transmitting a measurement report on a target cell to a serving cell; receiving, from the serving cell, a message containing a signature route sequence index, cyclic shift parameters, and information related to the component carrier of the target cell; confirming contention-based signatures generated on the basis of the signature route sequence index and cyclic shift parameters; and transmitting one of said contention-based signatures to the target cell for random access, via one or more component carriers, on the basis of said information related to the component carrier. The present invention also relates to an apparatus for the method.

6 Claims, 10 Drawing Sheets

(56) References Cited

U.S. PATENT DOCUMENTS

| | | |
|---|---|---|
| 2005/0124345 A1 | 6/2005 | Laroia et al. |
| 2008/0267131 A1 | 10/2008 | Kangude et al. |
| 2010/0142485 A1* | 6/2010 | Lee et al. ............ 370/331 |
| 2011/0081912 A1* | 4/2011 | Fischer et al. ........ 455/450 |

FOREIGN PATENT DOCUMENTS

| | | |
|---|---|---|
| KR | 20080073439 | 8/2008 |
| KR | 20090008403 | 1/2009 |
| KR | 1020090017379 | 2/2009 |
| WO | 2009/022878 | 2/2009 |

* cited by examiner

HANDOVER PERFORMED IN CONSIDERATION OF UPLINK/DOWNLINK COMPONENT CARRIER SETUP

CROSS-REFERENCE TO RELATED APPLICATIONS

This application is the National Stage filing under 35 U.S.C. 371 of International Application No. PCT/KR2010/001587, filed on Mar. 15, 2010, which claims the benefit of U.S. Provisional Application Ser. No. 61/265,728, filed on Dec. 1, 2009 and 61/159,862, filed on Mar. 13, 2009, the contents of which are all incorporated by reference herein in their entirety.

TECHNICAL FIELD

The present invention relates to a wireless communication system. More particularly, the present invention relates to a method and an apparatus for performing a handover.

BACKGROUND ART

Wireless communication systems are widely developed to provide a various kinds of communication services such as audio or data service. In general, a wireless communication system is a multiple access system capable of supporting communications with multiple users by sharing available system resources (bandwidths, transmission power, etc.). Examples of the multiple access system include a CDMA (Code Division Multiple Access) system, FDMA (Frequency Division Multiple Access) system, TDMA (Time Division Multiple Access) system, OFDMA (Orthogonal Frequency Division Multiple Access) system, SC-FDMA (Single Carrier Frequency Division Multiple Access) system, MC-FDMA (Multi-Carrier Frequency Division Multiple Access) system, etc.

DISCLOSURE

Technical Problem

An object of the present invention devised to solve the problem lies in a method and an apparatus for performing a handover in a wireless communication system. Specifically, the present invention provides a method and an apparatus for performing a handover in a wireless communication system which supports carrier aggregation.

It will be appreciated by persons skilled in the art that the objects that can be achieved with the present invention are not limited to what have been particularly described hereinabove and the above and other objects that the present invention can achieve will be more clearly understood from the following detailed description.

Technical Solution

In accordance with one aspect of the present invention, there is provided a method for enabling a user equipment to perform a handover in a wireless mobile communication system which supports carrier aggregation, the method including the steps of: transmitting a measurement report on a target cell to a serving cell; receiving, from the serving cell, a message containing a signature route sequence index, cyclic shift parameters, and information related to the component carrier of the target cell; recognizing contention-based signatures generated on the basis of the signature route sequence index and cyclic shift parameters; and transmitting one of the contention-based signatures to the target cell for random access, via one or more component carriers, on the basis of the information related to the component carrier.

In accordance with another aspect of the present invention, there is provided a user equipment including: an RF (Radio Frequency) module for receiving, from a source base station, a message containing a signature route sequence index, cyclic shift parameters, and information related to the component carrier of a target cell, and for transmitting a random access signature to the target base station; and a processor processing the message containing the signature route sequence index, the cyclic shift parameters, and the information related to the component carrier of the target cell, and preparing the random access signature based on the signature route sequence index and the cyclic shift parameters, wherein the random access signature is transmitted to the target base station via a component carrier identified by the information related to the component carrier of the target cell.

The information related to the component carrier may include information on allocation of component carriers assigned by the target cell to the user equipment. The information on allocation of component carriers may include index information related to an uplink component carrier performing the random access. The index information may include an index of a downlink component carrier linked with the component carrier which performs the random access.

Advantageous Effects

According to embodiments of the present invention, a handover can be efficiently performed in a wireless communication system. Specifically, a handover can be efficiently carried out in a wireless communication system which supports carrier aggregation.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Configurations, operations and other characteristics of the present invention will be easily understood according to embodiments of the present invention, described with reference to the attached drawings. Though the following embodiments will describe a case in which technical characteristics of the present invention are applied to a 3GPP system, the embodiments are exemplary and the present invention is not limited thereto.

Figure 1:
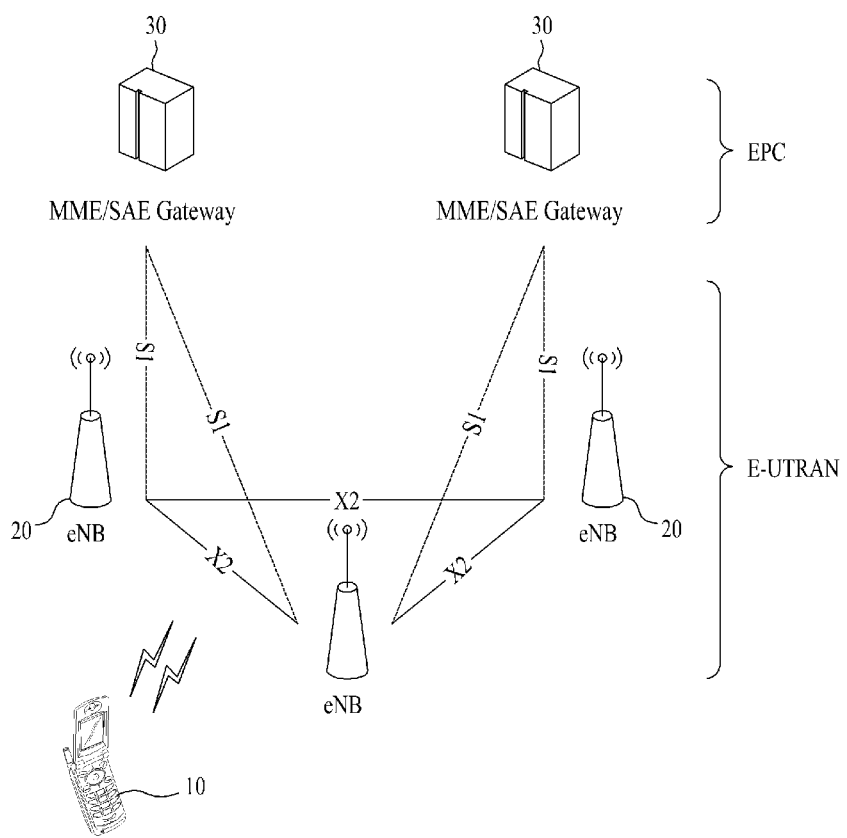
FIG. 1 shows a network structure of an E-UMTS (Evolved Universal Mobile Telecommunication System)

FIG. 1 shows a network structure of an E-UMTS. The E-UMTS is also referred to as a LTE system. A communication network is arranged in a wide range and provides various communication services such as audio and packet data service.

Referring to FIG. 1, an E-UMTS network includes an E-UTRAN (Evolved Universal Terrestrial Radio Access Network), an EPC (Evolved Packet Core), and one or more user equipments (UE). The E-UTRAN may include one or more base stations (eNB) 20. The one or more UEs 10 may be located in one cell. One or more E-UTRAN mobility management entity/system architecture evolution (MME/SAE) gateways 30 may be located at the end of the network and connected to an external network. In the specification, a downlink means transmission from the base station 20 to the UE 10 and an uplink means transmission from the UE 10 to the base station 20.

The UE 10 is a communication device carried by a user and may be referred to as a mobile station (MS), a user terminal (UT), a subscriber station (SS), or a radio device. Each base station 20 is a fixed station communicating with the UE 10 and may be referred to as an access point (AP). The base station 20 provides end points of a user plane and a control plane to the UE 10. One base station 20 may be located in each cell. An interface for transmitting user traffic or control traffic may be used between the base stations 20. Each MME/SAE gateway 30 provides end points of session and mobility management function to the UE 10. The base station 20 and the MME/SAE gateway 30 can be connected to each other through an S1 interface.

MME provides various functions including distribution of a paging message to the base stations 20, security control, idle state mobility control, SAE bearer control, and encryption of non-access stratum (NAS) layer signaling and integrity protection. An SAE gateway host provides various functions including completion of a plane packet and user plane switching for supporting mobility of the UE 10. The MME/SAE gateway 30 is simply referred to as a gateway in the specification. However, the MME/SAE gateway 30 includes both MME and SAE gateways.

A plurality of nodes may be connected through S1 interfaces between the gateways 30 and the base stations 20. The base stations 20 may be connected to each other through an X2 interface and neighbor base stations may have a mesh network structure with the X2 interface.

Figure 2:
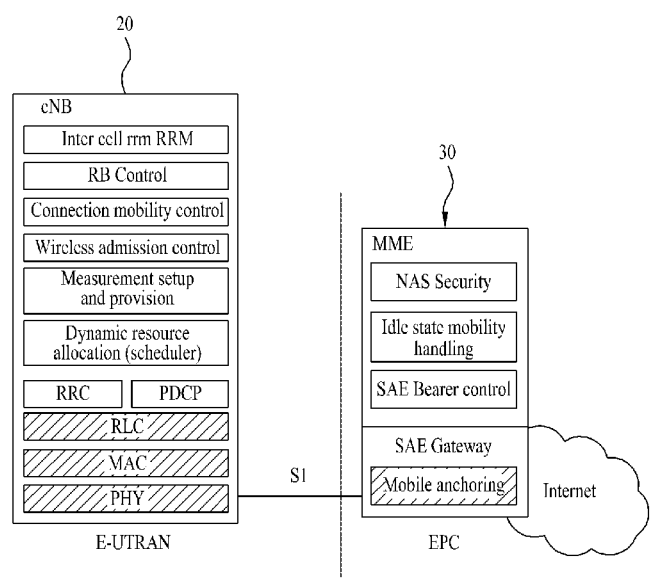
FIG. 2 shows structures of an E-UTRAN (Evolved Universal Terrestrial Radio Access Network) and a gateway.

FIG. 2 shows structures of a general E-UTRAN and the general gateway 30. Referring to FIG. 2, the base station 20 can execute functions such as selection of the gateway 30, routing to the gateway during activation of radio resource control (RRC), scheduling and transmission of a paging message, scheduling and transmission of broadcast channel (BCCH) information, dynamic resource allocation for the UE 10 on both uplink and downlink, configuration and preparation of base station measurement, radio bearer control, radio admission control (RAC), and connection mobility control. The gateway 30 can perform functions such as paging transmission, LTE_IDLE state management, user plane encryption, system architecture evolution bearer control, encryption of NAS layer signaling and integrity protection.

Figure 3:
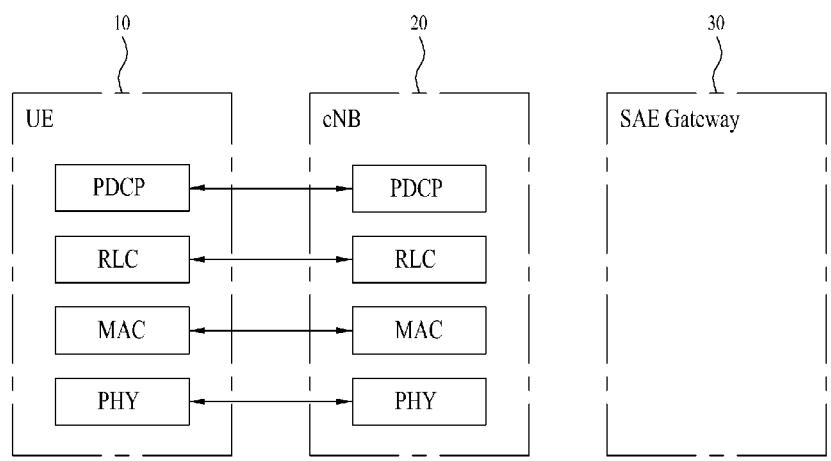
FIGS. 3 and 4 show user/control plane protocols with respect to an E-UMTS.
Figure 4:
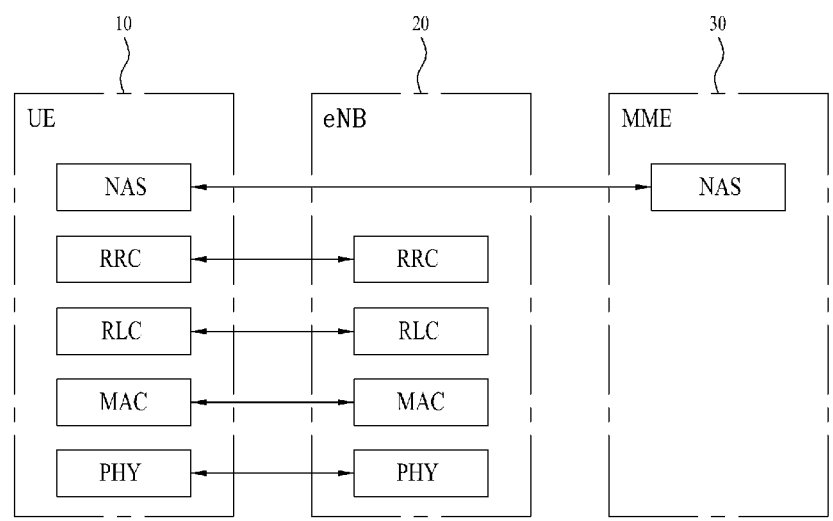

FIGS. 3 and 4 show user-plane protocol and control-plane protocol stacks for an E-UMTS. Referring to FIGS. 3 and 4, protocol layers can be divided into a first layer L1, a second layer L2, and a third layer L3 on the basis of lower three layers of the open system interconnection (OSI) standard model known in communication system technologies.

A physical layer PHY corresponding to the first layer L1 provides information transmission to an upper layer using a physical channel. The physical layer is liked to a medium access control (MAC) layer located at an upper level through a transmission channel, and data is transmitted between the physical layer and the MAC layer through the transmission channel. Data is transmitted between a physical layer of a transmitter and a physical layer of a receiver through a physical channel.

An MAC layer corresponding to the second layer L2 provides a service to a radio link control (RLC) layer corresponding to an upper layer through a logical channel. The RLC layer of the second layer L2 supports reliable data transmission. When the MAC layer performs an RLC function, the RLC layer is included in the MAC layer as a functional block. A PDCP (Packet Data Convergence Protocol) layer of the second layer L2 performs a header compression function. The header compression function efficiently transmits an Internet protocol (IO) packet such as IPv4 or IPv6 through a radio interface having a relatively narrow bandwidth.

A radio resource control (RRC) layer located at the lowest level of the third layer L3 is defined for a control plane only. The RRC layer controls a logical channel, a transmission channel and a physical channel with respect to setup, re-setup and cancellation of radio bearers (RBs). A radio bearer (RB) means a service provided by the second layer L2 for data transmission between the UE 10 and the E-UTRAN.

Referring to FIG. 3, the RLC layer and the MAC layer are finished in the base station 20 and can perform functions such as scheduling, automated retransmission request (ARQ) and hybrid automated retransmission request (HARQ). The PDCP layer is finished in the base station 20 and can execute functions such as header compression, integrity protection and encryption.

Referring to FIG. 4, the RLC layer and the MAC layer are completed in the base station 20 and perform the same function as those in the control plane. As shown in FIG. 3, the RRC layer is finished in the base station 20 and can perform functions such as broadcasting, paging, RRC connection management, radio bearer control, mobility function, and UE measurement report and control. As shown in FIG. 2(*c*), a NAS control protocol is finished in MME of the gateway 30 and can execute functions such as SAE bearer management, authentication, LTE_IDLE mobility handling, paging transmission in LTE_IDLE state, and security control for signaling between the gateway and the UE 10.

The NAS control protocol can use three states. A LTE-DETACHED state is used when RRC entity is not present. A LTE_IDLE state stores minimum UE information and is used when RRC connection is not present. A LTE_ACTIVE state is used when RRC state is set up. The RRC state is divided into RRC_IDLE and RRC_COMMECTED states.

In the RRC_IDLE state, the UE 10 perform discontinuous receiving (DRX) set by NAS using ID uniquely allocated thereto in a tracking region. That is, the UE 10 can receive broadcast of system information and paging information by monitoring a paging signal on a specific paging occasion for each UE-specific paging DRX cycle. In the RRC_IDLE state, no RRC context is stored in the base station.

In the RRC_CONNECTED state, the UE 10 can transmit/receive data to/from the base station using E-UTRAN RRC connection and context in E-UTRAN. Furthermore, the UE 10 can report channel quality information and feedback information to the base station. In the RRC_CONNECTED state, the E-UTRAN is aware of the cell to which the UE 10 belongs. Accordingly, the corresponding network can transmit and/or receive data to and/or from the UE 10, control mobility of the UE, such as a handover, and perform cell measurement with respect to neighboring cells.

Figure 5:
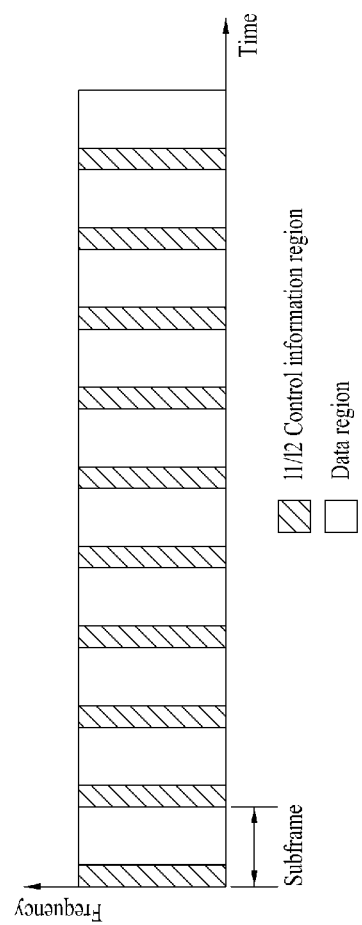
FIG. 5 shows a structure of a radio frame used in an E-UMTS.

FIG. 5 shows a structure of a radio frame used in an E-UMTS.

Referring to FIG. 5, the E-UMTS uses a radio frame of 10 ms. One radio frame includes ten subframes. One subframe has two continuous slots. The length of one slot is 0.5 ms. Furthermore, one subframe is composed of a plurality of symbols (for example, OFDM symbols, SC-FDMA symbols, etc.). One subframe is composed of a plurality of resource blocks, and one resource block includes a plurality of symbols and a plurality of subcarriers. Some (for example, a first symbol) of the plurality of symbols constituting one subframe can be used to transmit L1/L2 control information. A physical channel (for example, PDCCH (Physical Downlink Control Channel)) transmitting the L1/L2 control information is composed of subframes on the time domain and subcarriers on the frequency domain.

Figure 6:
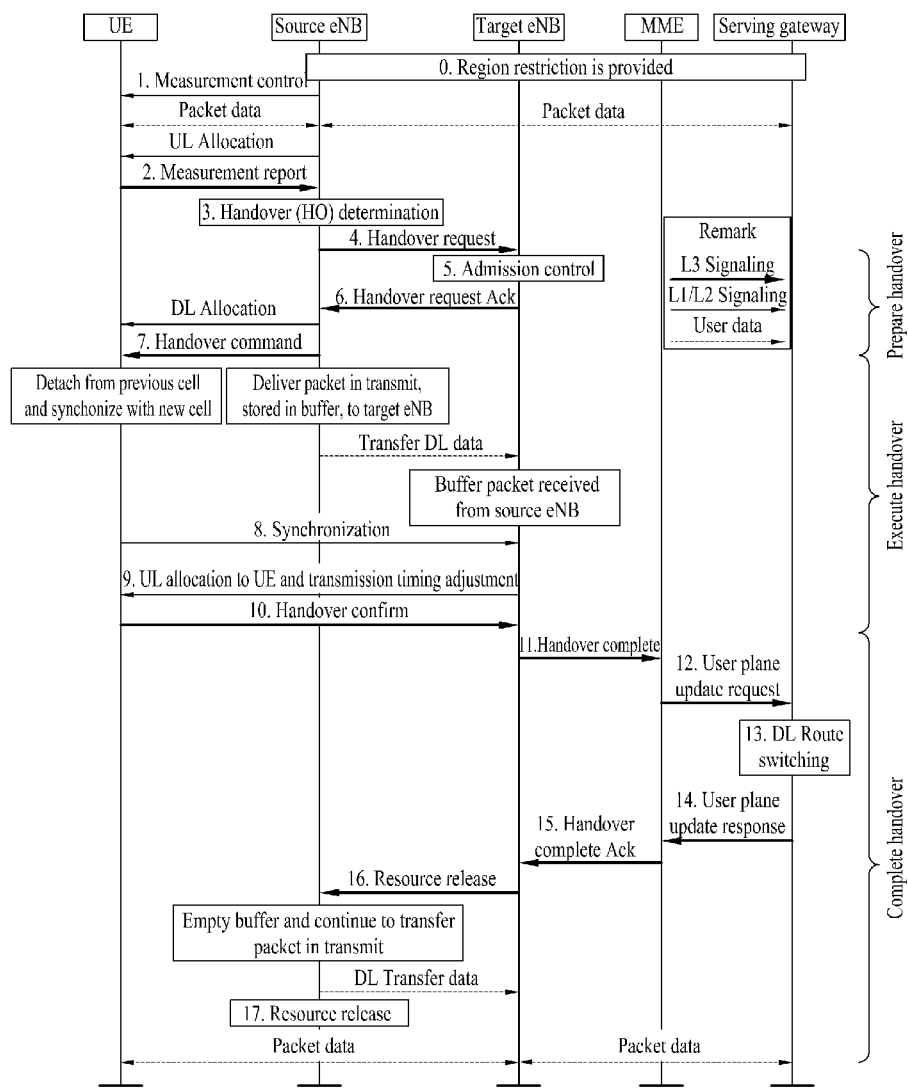
FIG. 6 illustrates a general handover process of a 3GPP ($3^{rd}$ Generation Partnership Project) LTE (Long Term Evolution) system.

FIG. 6 illustrates a handover process defined in the LTE. FIG. 6 shows a case in which MME and a serving gateway are not changed. The handover process is described below in detail with reference to 3GPP TS (Technical Specification) 36.300.

Step 0: UE context in a source base station eNB includes information on connection setup or roaming restriction set in the event of latest TA update.

Step 1: The source base station sets up an UE measurement process based on area restriction information. The measurement provided by the source base station can assist control of connection mobility of an UE.

Step 2: The UE is triggered to transmit measurement report according to a rule set by system information, etc.

Step 3: The source base station determines whether or not to handover the UE on the basis of the measurement report and RRM (Radio Resource Management) information.

Step 4: The source base station transmits information for a handover to a target base station through a handover request message. The information required for the handover includes UE X2 signaling context reference, UE S1 EPC signaling context reference, target cell ID, RRC context including UE identifier (for example, Cell Radio Network Temporary Identifier; C-RMTI) in the source base station, etc.

Step 6: The target base station prepares L1/L2 and handover and transmits a handover request acknowledge (ACK) message to the source base station. The handover request ACK message includes a transparent container (RRC message) transmitted to the UE to perform the handover. The container includes new C-RNTI and a security algorithm identifier of the target base station. In addition, the container may additionally include an access parameter and an additional parameter such as SIB. Furthermore, the target base station can divide RA signatures into a non-contention based RA signature set (referred to as group 1 hereinafter) and a contention based RA signature set (referred to as group 2 hereinafter), select one of signatures of group 1 and inform the UE of the selected signature. That is, the container may further include information on a dedicated RA signature. Moreover, the container may include information on an RACH slot duration for which the dedicated RA signature will be used.

Step 7: The source base station generates an RRC message (for example, RRC Connection Reconfiguration message) having mobility control information on the UE and transmits the RRC message to the UE in order to perform the handover. The RRC connection reconfiguration message includes parameters required for the handover (for example, new C-RNTI and the security algorithm identifier of the target base station, and information on the dedicated RACH signature and target base station SIB which are optional) and instructs the handover to be performed.

Step 8: The source base station transmits a SN (serial number) status transfer message to the target base station so as to transfer uplink PDCP SN reception status and transfer downlink PDCP SN transmission status.

Step 9: The UE attempts to access a target cell using a RACH process after receiving the RRC connection message. RACH is performed on a non-contention basis if a dedicated RACH preamble is allocated and carried out on a contention basis if not.

Step 10: The network performs uplink allocation and timing adjustment.

Step 11: When the UE successfully accesses the target cell, the UE transmits RRC Connection Reconfiguration Complete message (C-RNTI) to confirm the handover and transmits an uplink buffer status report to thereby inform the target base station that the handover process is completed. The target base station confirms C-RNTI received through a handover confirmation message and starts to transmit data to the UE.

Step 12: The target base station transmits a path switch message to the MME so as to indicate that the UE has changed the cell.

Step 13: The MME transmits a user plane update request message to a serving gateway.

Step 14: The serving gateway switches a downlink data path to the target. The serving gateway transmits an end marker packet to the source base station through the existing path, and then cancels user plane/TNL resources for the source base station.

Step 15: The serving gateway transmits a user plane update response message to the MME.

Step 16: The MME responds to the path switch message using a path switch ACK message.

Step 17: The target base station transmits a UE context release message to inform the source base station that the handover has been successfully completed and triggers resource release.

Step 18: Upon reception of the UE context release message, the source base station releases user plane related resources which are associated with UE context.

Figure 7:
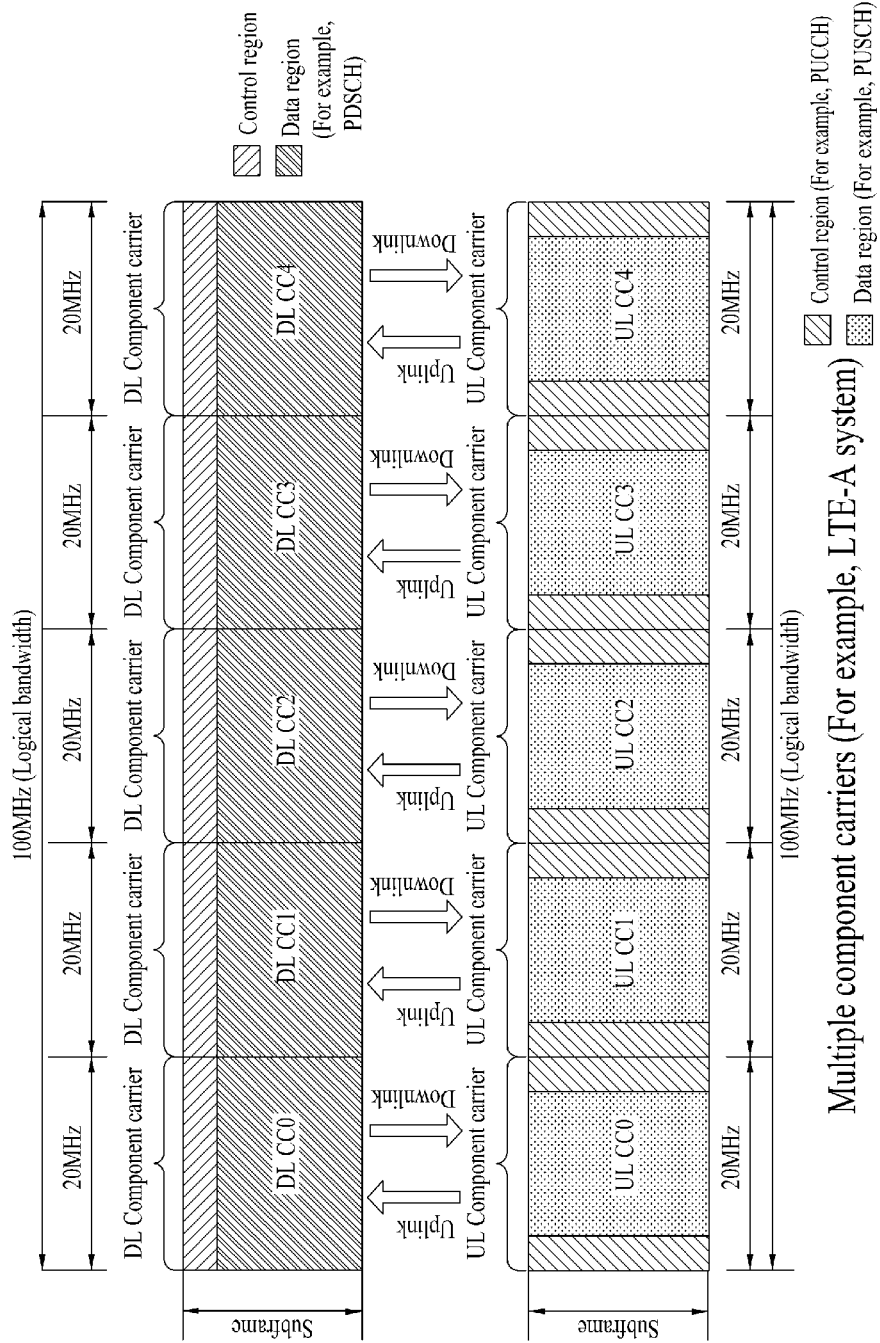
FIG. 7 shows an example of performing communication in a carrier aggregation state.

FIG. 7 illustrates an example of communication performed in a carrier aggregation state. FIG. 7 can correspond to an example of communication in an LTE-A (Advance) system. The LTE-A system uses carrier aggregation or bandwidth aggregation which aggregates a plurality of uplink/downlink frequency blocks to use wider uplink/downlink bandwidths in order to use a wider frequency band. Each frequency block is transmitted using a component carrier (CC). The CC may mean a frequency block for carrier aggregation or a center carrier of the frequency block according to context, and the frequency block and the center carrier are used together.

Referring to FIG. 7, five 20 MHz CCs can be aggregated in uplink/downlink to support a bandwidth of 100 MHz. The CCs may be contiguous or non-contiguous in the frequency domain. The radio frame structure illustrated in FIG. 5 can be also applied to a case using multiple component carriers. FIG. 7 shows a case in which the UL CCs and DL CCs have the same bandwidth and are symmetrical for convenience. However, the bandwidths of the UL CCs and DL CCs can be independently determined. For example, the UL CCs can have bandwidths of 5 MHz (UL CC0)+20 MHz (UL CC1)+ 20 MHz (UL CC2)+20 MHz (UL CC3)+5 MHz (UL CC4). Asymmetrical carrier aggregation in which the number of UL CCs is different from the number of DL CCs can be used. The asymmetrical carrier aggregation may be generated due to restriction on available frequency band or may be artificially constructed according to network setup. Furthermore, though FIG. 7 shows that an uplink signal and a downlink signal are transmitted through one-to-one mapped CCs, the signals may be transmitted through different CCs according network setup or signal type. For example, a CC transmitting a scheduling command may be different from a CC transmitting data according to the scheduling command. Furthermore, uplink/downlink control information may be transmitted through specific UL/DL CCs regardless of whether or not CCs are mapped.

Even when the overall band of a system is composed of N CCs, a frequency band that a specific UE can receive may be limited to M (<N) CCs. Various parameters for carrier aggregation can be set according to a cell-specific, UE group-specific or UE-specific method. Accordingly, when N CCs are presented in a cell, a UE may receive a PDSCH (Physical Downlink Shared Channel) through all the N CCs. However, a base station may limit the number of CCs through which the UE can receive the PDSCH to M (M<N) in a semi-static manner. Although the following description is made on the assumption that embodiments of the present invention are applied to N CCs, it is apparent that it is also possible to divide N (or M) CCs allocated to a UE into L CC groups and apply the embodiments of the present invention to each CC group.

A process of enabling a UE to initially access a serving cell will now be described.

Step 1: The UE performs cell search on a frequency raster of 100 kHz or 300 kHz.

Step 2: When a SCH (Synchronization channel) is detected from one of aggregated DL CCs, the UE receives a PBCH (Physical Broadcast Channel) in the DL CC. After the PBCH is received, a DL BW (Downlink Bandwidth), the number of Tx antennas, and PHICH (Physical Hybrid ARQ Indication Channel) setup are obtained. In addition, the UE acquires system information (SI-2) through the DL CC from which the SCH has been detected. For example, UL EARFCN (E-UTRA Absolute Radio Frequency Channel Number), UL BW and configuration of various physical channels are obtained. Furthermore, upon reception of the PBCH and SI-2, the UE acquires information on an UL CC linked with the DL CC. In case of a carrier aggregation system, it is desirable to receive system information (that is, aggregated CC configuration employed by a cell) on DL and/or UL setup through a single CC during an initial access process such that cell search complexity does not increase according to system bandwidth.

Step 3: After cell search and reception of the PBCH, the UE aligns uplink timing and performs random access to obtain UE ID. To achieve this, the UE transmits RACH preamble (that is, signature) on the UL CC on the basis of PRACH configuration of system information received through the DL CC.

Step 4: The UE receives an RACH response message and transmits an RACH message (MSG) 3 to a base station.

Step 5: The base station receives the RACH MSG 3 and transmits RACH MSG 4 to the UE.

Step 6: After collision has been overcome, the UE receives UE-specific or UE-common CC allocation information (that is, information on allocated UL/DL CCs) from the base station. CC allocation information may be semi-statically transmitted through RRC signaling or dynamically transmitted through L1/L2 signaling (for example, PDCCH).

UE-specific CCs can be allocated to an arbitrary UE through initial access to a serving cell and UE-specific RRC signaling and/or UE-specific L1/L2 control signaling in the serving cell according to the above method. Alternatively, UE-common CCs can be allocated to an arbitrary UE through cell (or eNB)-specific RRC signaling and/or UE-common L1/L2 control signaling (for example, PDCCH). UE-specific CC allocation information may include information for allocating one or more DL CCs and/or one or more UL CCs in different forms according to UE capability. Furthermore, the UE-specific CC allocation information may include information for UE-specifically overriding fundamental CC configuration information (for example, CC index information of active DL CCs/UL CCs for scheduling, DL CC-UL CC linkage information may be added according to circumstances) of a cell/base station. For example, if fundamental cell configuration has a symmetrical form in which the number of DL CCs equals to the number of UL CCs and the DL CCs and the UL CCs are linked one to one, each UE can be informed of new DL CC-UL CC linkage information such that the UE is allowed to perform asymmetrical carrier aggregation.

Embodiment 1-1

Handover in a Carrier Aggregations State

Figure 8:
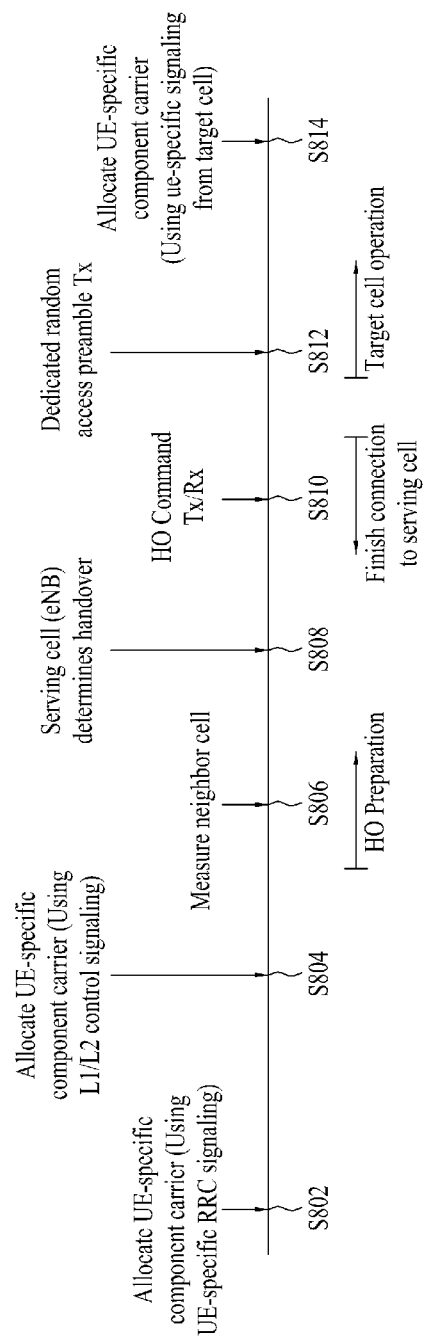
FIG. 8 illustrates a general handover process according to an embodiment of the present invention.
Figure 9:
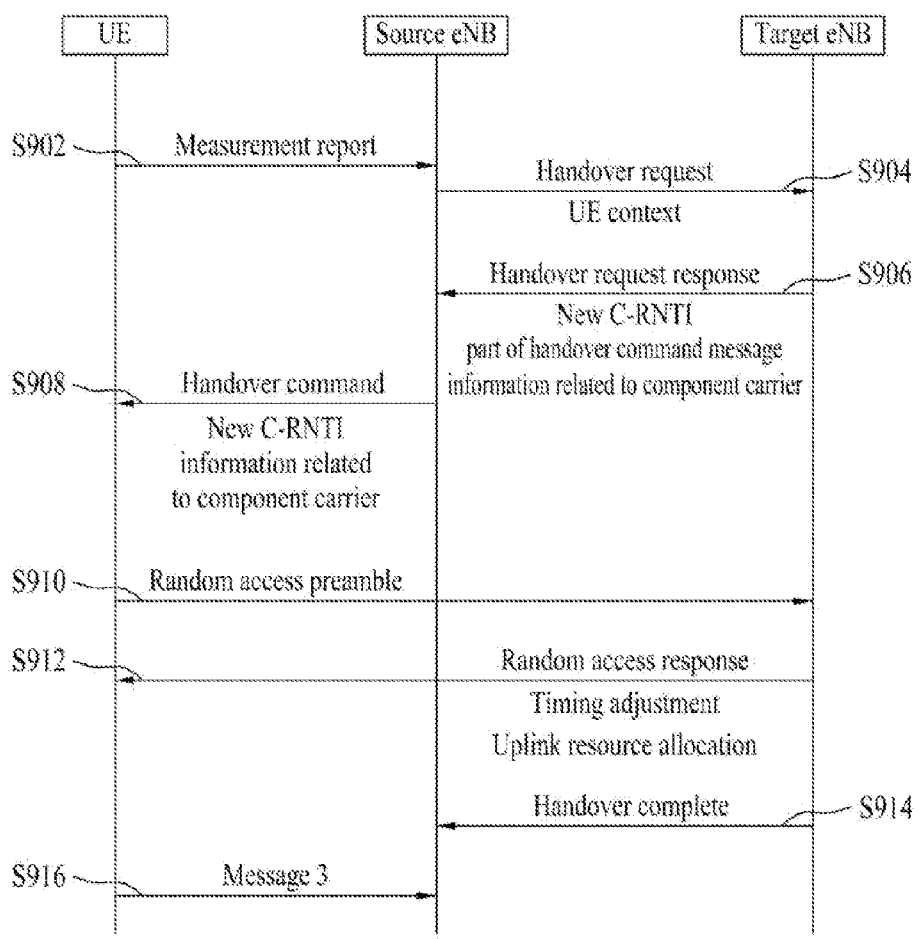
FIG. 9 illustrates a handover process according to an embodiment of the present invention.

FIGS. 8 and 9 illustrate a handover process according to an embodiment of the present invention.

Referring to FIGS. 8 and 9, a UE performs communication using CCs allocated thereto by a serving cell in a state in which a handover is not triggered (S802 and S804). For convenience of explanation, the CCs allocated to the UE are referred to as an active CC set. The CCs may be allocated according to a UE-specific, UE-common or cell-specific method. For example, the CCs can be allocated using RRC signaling and/or L1/L2 control signaling. Component carrier allocation through UE-specific or UE-common L1/L2 control signaling may be performed dynamically or semi-dynamically. Component carrier allocation using L1/L2 control signaling can override component carriers allocated through RRC signaling.

When a handover condition is satisfied (for example, when signal intensity is decreased), the UE performs neighbor cell measurement (S806), and reports the measurement result to the serving cell (S902). A base station of the serving cell determines the handover on the basis of the measurement report of the UE (S808), and transmits a handover request message with UE context to a target cell (S904). The target cell transmits a handover request response message to the serving cell (S906). The handover request response message includes basic information required for the UE to perform initial transmission in the target cell. Specifically, the handover request response message includes new C-RNTI, part of a handover command message, and information on a dedicated signature for non-contention based random access (that is, random access preamble). The signature is reserved at this time. Furthermore, the handover request response message includes information on component carriers of the target cell. The information on the component carriers includes DL CC and/or UL CC setup information for performing initial access and/or initial transmission and reception in the target cell, or DL CC and/or UL CC configuration information constituting the cell.

The serving cell transmits the handover command message to the UE (S810 and S908). The handover command message includes new C-RNTI, random access related information (for example, a signature route sequence index, a cyclic shift parameter, and dedicated signature), and information on CCs of the target cell. The UE acquires basic information required to perform initial transmission in the target cell from the handover command message, and then transmits a random access preamble (for example, a dedicated random access preamble) to the target cell (S812 and S910). Subsequently, the UE synchronizes with the target cell through message hand shaking and performs an information exchange process, to thereby complete the handover process (S912, S914 and S916). Then, the UE can receive UE-specific component carrier information from the target cell through RRC signaling and/or L1/L2 control signaling (S814).

Processes which can be related with carrier aggregation setup among UE operations in the handover process will be explained in more detail.

Process 1: The UE Measures a Neighbor Cell (S806 of FIG. 8).

The UE may have two CC allocation schemes at a handover triggering time.

In the first scheme, the UE can be converted into a single CC state on a downlink and/or an uplink at the handover triggering time in consideration of the handover triggering time and probability of a situation in which geometry on a channel of the corresponding UE is deteriorated. Conversion into the single CC state can be performed through RRC signaling or L1/L2 control signaling. That is, in a handover triggering state, the UE may be in a state in which carrier aggregation is not set up (scheme A). Scheme A is identical to the neighbor cell search method in the LTE and means that intra-frequency measurement is preferentially performed through one DL CC.

In the second scheme, a specific state may not be premised for carrier aggregation of the UE at the handover triggering time considering that allocation of CCs to the UE is determined by RRC or scheduler. That is, UE CC allocation may be performed in a carrier aggregation state or in a non-carrier aggregation state at the handover triggering time (scheme B). In this state, neighbor cell measurement for the handover may be performed on all the DL CCs (that is, active DL CC set) allocated to the UE, simultaneously. Considering that the UE can support a plurality of DL CCs, neighbor cell measurement can be performed on all DL CCs currently assigned through CC allocation or constituted by the base station, or a plurality of DL CCs predetermined by signaling or arbitrary agreement from the beginning.

Alternatively, when the UE sets up a plurality of DL CCs in scheme B, neighbor cell measurement can be preferentially performed on only one or some of the corresponding DL CCs (that is, active DL CC set). The neighbor cell measurement can be performed on the corresponding DL CC(s) only. If an appropriate cell cannot found only with the corresponding DL CC(s), a process of searching another CC band may follow the neighbor cell measurement process. CCs on which the neighbor cell measurement is preferentially performed may be UE-specific, cell-specific or cell-common DL CC(s) for a handover, and can be referred to as primary DL CC(s) or anchor DL CC(s) for convenience. In this case, one or more primary or anchor DL CCs may be commonly set for cells in a predetermined range in order to construct a stabilized handover measurement environment in a multi-cell environment. Definition of a primary CC or an anchor CC described in the present invention is needed. The primary or anchor UL CC means an UL CC configured and designated for uplink control information transmission basically. In an extended sense, the primary or anchor UL CC may include an UL CC which becomes a standard for uplink physical signal transmission. The primary or anchor DL CC is defined as a specific DL CC for transmitting control information that manages connection with a corresponding UE, which is a CC that is a default of CC reconfiguration. Also, the primary or anchor DL CC can be defined as a DL CC that transmits NAS (Non-Access Stratum) information for authentication and security to a UE. Furthermore, the primary or anchor DL CC may be defined as a DL CC that transmits specific cell-specific, UE-common control information or UE-specific control information.

Process 2: the UE Transmits Measurement Report to the Serving Cell (902 of FIG. 9).

The UE can transmit a measurement report for each CC through an UL CC linked to a DL CC on which neighbor cell measurement has been performed. Here, signaling for measurement triggering may be performed through one or more designated DL CC(s) (for example, primary or anchor CC(s)) or respectively performed for individual DL CCs when a plurality of DL CCs are present. In addition, the measurement triggering may be independently set for the respective DL CCs. Alternatively, when a UE-specific or cell-specific primary or anchor DL CC is set, the UE can transmit a measurement report to an UL CC linked to the DL CC. Furthermore, when a UE-specific or cell-specific primary or anchor UL CC is set, the UE may transmit a measurement report to the UL CC. Alternatively, one or more UL CC(s) for measurement report may be signaled explicitly or implicitly, or implicitly designated by the UE without additional signaling. If a plurality of candidate UL CCs for transmitting measurement report is present, one or some of the candidate UL CCs may be separately designated. Here, signaling (for example, RRC signaling or L1/L2 control signaling) to the UE may be defined in order to designate the UL CCs. Otherwise, the UL CCs may be designated (indirectly or implicitly) according to circumstances without signaling definition such that additional signaling overhead is not generated. Measurement information on the plurality of DL CCs may be joint-coded, separated or repeated. The measurement report is transmitted from the UE on a report time determined by the base station, and can be transmitted using one or more uplink subframes.

When the serving cell determines the handover based on the measurement report of the UE, and then transmits the handover request message to the target cell, the serving cell can send DL CC and/or UL CC configuration information and/or specific primary or anchor DL CC and/or UL CC configuration information on the UE together with the handover request message, and thus share the CC setup state of the UE during the handover with the target cell. In this case, the target cell can allocate one or more UL CCs for initial access or initial transmission and reception to the UE on the basis of information from the serving cell. For example, the target cell can designate a required number of (dedicated) PRACH preamble resources for the UE and feed them back to the serving cell so as to allow the UE to transmit dedicated PRACH preamble(s) through a plurality of UL CCs in the following process.

Process 3: The Serving Cell Transmits a Handover Command to the UE (S810 of FIG. 8 and S908 of FIG. 9).

The base station of the serving cell generates handover command information on the basis of the handover related information received from the target cell, transmits the handover command information to the UE, and starts to cancel connections of the serving cell, which relate to the UE, from an upper layer. Here, the target cell can allocate one or more DL CCs and/or one or more UL CCs in order to provide continuity of service quality for the handover UE, and information on the DL CCs and/or UL CCs can be included in the handover command message. CC allocation information of the target cell can be used for initial access to the target cell and/or subsequent initial transmission and reception. For this, the handover command message can directly include information (for example, index) for indicating one or more DL CCs and/or one or more UL CCs.

The handover command message may include additional information related to CC allocation of the target cell if required. The additional information may include UL CC configuration information for RPACH preamble transmission and PRACH preamble resource information. For example, if a plurality of UL CCs is allocated and a (dedicated) PRACH preamble is transmitted through one of the UL CCs, the additional information can include UL CC index information for PRACH preamble transmission and (dedicated) PRACH preamble resource information. In addition, when the (dedicated) PRACH preamble is transmitted for each UL CC or for the plurality of UL CCs (for example, in case of non-continuous CC allocation), the additional information may include information on a plurality of (dedicated) PRACH preamble resources, and UL CC index information related to the information if required. The UL CC index information and (dedicated) PRACH preamble resource information may be contained in the handover command message as one information item. The PRACH preamble resource information includes a signature route sequence index, a cyclic shift parameter, and a dedicated signature. A sequence for the signature includes CAZAC sequence and Zadoff-chu sequence.

One or more UL CCs of the target cell may be set up using the handover command message and/or UL CC information set by the existing serving cell. The number/target of UL CCs that transmit the dedicated PRACH preamble sequence may be embodied through a separate UL (or UL/DL) CC setup process related to RACH. Furthermore, a limited number (including one)/target of CCs among UL CCs set up in the target cell can individually transmit uplink dedicated PRACH preamble without additional CC configuration for RACH.

The UL CC configuration information can be explicitly signaled (for example, index) through the handover command message or indirectly confirmed using DL CCs configuration information. For example, only DL CCs are explicitly indicated through the handover command message, and the UE grasps information on UL CCs on the basis of CC information of the serving cell or information implicitly acquired from the handover command message. In addition, the UL CCs may be UL CCs linked to DL CCs set up by the handover command message (this linkage relationship may be set in a previous serving cell or may be common for a plurality of cells). Furthermore, the UL CCs may relate to primary or anchor DL CCs or may be independently configured primary or anchor UL CCs according to circumstances.

Since access to the target cell is performed upon reception of the handover command, the handover command is not required to transmit the whole information about UE-specific multi-CC allocation. Accordingly, the handover command can transmit only single DL/UL CC allocation information for accessing the target cell. Alternatively, the handover command may transmit information on a single DL CC, and the UE may receive system information from the corresponding DL CC of the target cell and then acquire information on an UL CC linked to the DL CC. The single DL CC allocated through the handover command may be a primary or anchor DL CC of the target cell. Cell-specific CC configuration information of the target cell may be indicated through the handover command.

The DL CC for initial transmission and reception between the target cell and the UE during the handover may not be additionally designated by the handover command message. In this case, the DL CC for initial transmission and reception may be a DL CC on which measurement has been performed for the corresponding cell or DL CCs transmitting the handover command message or one of the DL CCs. Otherwise, the DL CC for initial transmission and reception may be a series of primary or anchor DL CCs set up in the serving cell.

The handover command may be configured to induce an operation on a single DL CC and a single UL CC in the following target cell operation in order to minimize a variation in the LTE handover process and reduce overhead of the handover process. To achieve this, the handover command message can be composed of the same information as that of the LTE. Furthermore, the handover command may include an index of a single DL CC and/or UL CC in a multi-DL/UL CC state. In particular, the handover command message may include index information on the corresponding UL CC. Alternatively, the UL CC may be an UL CC for which a linkage with a DL CC set up through the handover command message is set. Here, the linkage may be a linkage set in the serving cell or a specific linkage commonly set among a plurality of arbitrary cells. Alternatively, the UL CC may be an UL CC linked to arbitrary primary or anchor DL CC(s) and may be one or more primary or anchor UL CCs separately configured.

Meantime, a plurality of DL CCs and/or UL CCs may be set up for the target cell initial operation without an additional instruction by the handover command message. In this case, the plurality of DL CCs and/or UL CCs can be set up using a setup state of a plurality of DL CCs and/or UL CCs of the serving cell or a setup state of a plurality of primary DL CCs and/or primary UL CCs.

In view of DL CCs transmitting the handover command message in the serving cell, a base method is to transmit the handover command message using all one or more DL CCs configured for the corresponding UE at the corresponding time. This may satisfy reliability of the handover command message transmission reliability. Another method is to transmit the handover command message through a primary or anchor DL CC, or a plurality of primary or anchor DL CCs. The primary or anchor DL CC may be set up UE-specifically, cell-specifically or cell-commonly for the handover. If the handover command message is transmitted through a plurality of DL CCs, though the DL CCs have the same transmission timing basically, different transmission timings may be set for the respective DL CCs at a subframe level in consideration of processing load. For example, staggering or fixed offset can be applied to the transmission timing for each DL CC. On the other hand, the handover command message may be transmitted using only one DL CC (for example, a primary (anchor) DL CC or a DL CC on which neighbor cell measurement is performed) in order to reduce processing load in the handover process or for the same purpose as that of the LTE. Additionally, the handover command message may be transmitted through the overall or some of the DL CCs set up as the active CC set for reliability of the handover command.

The handover command message may include information on setup of one or more DL CCs and/or one or more UL CCs for supporting an operation of accessing the target cell. At this time, the DL CCs may be primary DL CCs of the target cell. In the same manner, the UL CCs may be primary UL CCs of the target cell. The handover command message may include information for designating primary DL CCs and/or primary UL CCs having the attribute described in the above explanation, separately from information on setup of DL CCs and UL CCs used for transmission and reception between the target cell and the UE in some cases.

Process 4: The UE Transmits a Random Access Preamble to the Target Base Station (S812 of FIG. 8 and S910 of FIG. 9).

The UE can transmit a (dedicated) PRACH preamble through one or more UL CCs of the target cell using information about a (dedicated) random access preamble allocated through the handover command message. Information (for example, the number and/or indexes of UL CCs) on the UL CCs which transmit the (dedicated) PRACH preamble may be embodied through a process of setting up UL CCs or DL CCs/UL CCs in the target cell during the handover process, and additional information (for example, the number and/or indexes of UL CCs) on setup of the UL CCs for transmitting the (dedicated) PRACH preamble may be signaled to the UE. For example, the UE can transmit the (dedicated) PRACH preamble through a designated UL CC after receiving UL CC index information for transmitting PRACH and (dedicated) PRACH preamble resource information through the handover command message.

When the (dedicated) PRACH preamble is transmitted through one or more UL CCs designated in the target cell, the UE can confirm UL CC information (for example, index) about the transmission of the (dedicated) PRACH preamble through the UL CCs using the handover command message. For example, the UL CC information can be directly included in the handover command message, or configured by the UE as detailed PRACH preamble transmission resource information in connection with the (dedicated) RACH preamble resource information transmitted to the UE through the handover command message. Alternatively, UL CCs can be set up in the target cell on the basis of information on setup of CCs for the UE and setup of one or more primary CCs from the serving cell at the handover time, as described above, without signaling of the detailed UL CC information from the target cell. To achieve this, advance information sharing between the serving cell and the target cell may be premised. Alternatively, the target cell can blind-detect a (dedicated) PRACH preamble signal of the UE for the UL CCs configured by the target cell.

A detailed method for the above-mentioned advance information sharing between the serving cell and the target cell is explained. When the serving cell determines the handover based on the measurement report from the UE and then transmits the handover request message to the UE, the serving cell can send DL CC/UL CC configuration information and/or specific primary or anchor DL/UL CC configuration information for the UE at the time when the handover request message is transmitted from the serving cell together with the handover request message such that the target cell shares a carrier setup sate in the serving cell for the UE during the handover. In addition, when the UE transmits the (dedicated) PRACH preamble through one or more UL CCs, the target cell can designate a required amount of (dedicated) PRACH preamble resources on the basis of the information shared with the serving cell, and feed the designated (dedicated) PRACH preamble resources back to the serving cell. Upon reception of the (dedicated) PRACH preamble resources, the serving cell can transmit the (dedicated) PRACH preamble resources to the UE through the handover command message.

UL CCs transmitted by the UE can be set up in the target cell on the basis of information on setup of CCs for the UE and information on setup of one or more primary CCs from the serving cell at the handover time without signaling of the UL CCs. In this case, UL CC configuration information can be shared in advance between the target cell and the serving cell. The target cell can detect the dedicated PRACH preamble of the UE through blind detection for each UL CC without sharing additional information with the serving cell.

Process 5: The UE Performs Synchronization with the Target Cell and the Handover Process is Completed (S912 and S914 of FIG. 9).

If the handover through a non-contention based RA process (using a dedicated RA preamble) fails, the UE performs synchronization with the target cell through a contention based RA process. Upon completion of the handover with the target cell, the target cell transmits a handover complete message to the serving cell. The serving cell receives the handover complete message, completes all connections of user/control planes with the UE, and completes connections for respective CCs.

Process 6: The Target Cell Sets up DL CCs and/or UL CCs for the Handover UE (S814 of FIG. 8).

Upon completion of the handover process, the UE can transmit/receive data/control information to/from the target cell through DL/UL CC(s) allocated in the handover process (for example, handover command message, RA process). The target cell can signal DL/UL CC allocation information through UE-specific (or cell-specific) RRC signaling and/or UE-specific (or cell-specific) L1/L2 control signaling in order to update CC allocation to the UE. For example, the CC allocation information can be included in a response message for transmission of one or more (dedicated) RACHs, and can be separately signaled in a response message transmission process or the following process.

Methods for configuring, setting up and signaling DL/UL CCs on a handover complete time in the target cell can be implemented in the same manner as allocation of CCs to the UE in the serving cell before the handover process. For example, the CC allocation information can directly include information (for example, index) that indicates one or more DL CCs and/or one or more UL CCs. UL CC configuration information may be explicitly signaled, or indirectly confirmed using DL CC configuration information. For example, UL CC information can be indirectly confirmed using DL CC and UL CC linkage relationship.

The proposed methods relating to configuration, setup and signaling of DL CCs and/or UL CCs for the UE before and after the handover process in the above processes 1 to 6 can be individually performed, or the overall or some of the methods can be combined and carried out.

Embodiment 1-2

Handover 2 in Consideration of Frequency Aggregation

The embodiments 1-1 and 1-2 can be used together or independently used. The fundamental concept of the conventional handover process is that a UE receives a handover command, and then leaves a serving cell. However, the UE can perform a handover only for some (for example, one) of a plurality CCs in the embodiment of the present invention. In other words, if the UE uses two DL CCs and two UL CCs and can handle at most two CC, some of DL/UL CCs can perform a handover and the remaining DL/UL CCs can transmit/receive traffic with the serving cell. The DL/UL CCs performing the handover may be primary CCs or anchor CCs. When the UE succeeds in connecting with the target cell, the UE can transmit/receive data to/from the target cell through a DL/UL CC set up by the target cell during the handover. Then, the remaining DL/UL CCs to be used by the UE in the target cell can be additionally set up through (UE-specific) carrier aggregation in the target cell.

To complete the handover process for the DL/UL CC set of the UE and transmit/receive data in the target cell, a process of canceling connection of the remaining DL/UL CC(s) is required. To achieve this, the target cell can transmit a message (for example, a handover confirm message) that indicates successful completion of the handover to the serving cell. Upon reception of the handover confirm message, the serving cell can send information for canceling the connection of the remaining DL/UL CCs with the serving cell to the UE through signaling. When connection of the active DL/UL CC(s) allocated to the UE by the serving cell is released, the UE can be re-allocated UE-specific DL/UL CCs by the target cell through the DL/UL CCs used for the handover. Furthermore, upon release of connections for all the active DL/UL CC(s) allocated to the UE from the serving cell, the UE can use the DL/UL CCs used for the handover in the serving cell or CCs relating to the DL/UL CCs in the target cell even without additional signaling from the target cell.

Although a base station allocates DL/UL CCs to a UE depending on UE capacity, the base station does not always allocate DL/UL CCs corresponding to the UE capacity. Otherwise, there may exist CCs which are not used though allocated to the UE. If the UE has remaining capacity and CCs unused in the serving cell are present, the UE can perform a handover using DL/UL CCs corresponding to the remaining capacity thereof. That is, the UE can receive and transmit a downlink physical signal/physical channel and an uplink physical signal/physical channel, which are required for the handover, respectively using the corresponding DL/UL CCs. If a primary DL CC and/or a primary UL CC is defined among active CCs allocated to the UE, the UE can access the target cell using the corresponding primary CC. If primary DL CCs or primary UL CCs are aggregated in the serving cell, the base station can select the corresponding primary CC as a CC for the handover.

Embodiment 2

Handover in Consideration of CoMP

The embodiment 1 is based on the assumption that the handover process of the UE is identical to the handover process defined in the LTE. However, when coordinated multiple points (CoMP) transmission/reception or a software handover (a kind of CoMP), which is newly considered in an advanced system such as LTE-A, is introduced, a downlink or uplink CoMP situation may be premised during a handover preparation process or before the handover preparation process. Additional suggestions for a handover process including CoMP and changed suggestions will now be explained. For convenience, CoMP is used as a concept including the software handover.

Two options may be considered for a handover processing including CoMP. Option 1 corresponds to a case in which a CoMP transmission mode is set before the handover preparation process. Option 2 corresponds to a case in which the CoMP transmission mode is set after the handover preparation process is triggered. For example, in case of option 2, a downlink and/or uplink CoMP mode can be set during the handover preparation process. Specifically, the CoMP mode can be set before or after the neighbor cell measurement process. When the CoMP mode is set, connection with the serving cell can be finished at an arbitrary time on the basis of RSRP (Reference Signal Received Power) and/or RSRQ (Reference Signal Received Quality) of the serving cell.

An embodiment of the present invention is described on the basis of option 1. In option 2, the process described in the embodiment 1 can be applied to a handover process before the CoMP mode is set. On the other hands, suggestions of option 1 which will be described below can be applied to handover processes for a corresponding UE after the CoMP mode is set.

Option 1 is based upon a situation in which the UE is connected with one or more neighbor cells before a handover. Accordingly, neighbor cell measurement in the handover preparation process can be replaced by measurement for a measurement cell set in the CoMP mode on the basis of RSRP or RSRQ Of the serving cell. For CoMP measurement, particulars of neighbor cell measurement, illustrated in S806 of FIG. 8 can be applied to a method for configuring, setting up and signaling DL CCs for the corresponding UE. Alternatively, the neighbor cell measurement process for the handover can be performed separately from CoMP measurement on the basis of a difference between a target cell of CoMP measurement and a target cell of neighbor cell measurement, or attributes of the measurement. The neighbor cell measurement can employ the neighbor cell measurement process illustrated in S806 of FIG. 8.

In the same manner, a measurement report process for the handover can be replaced by a process of reporting a measurement result with respect to a reporting cell set in the CoMP mode. In this case, the particulars described in the process 2 (S902 of FIG. 9) of the embodiment 1 can be applied to a method for configuring, setting up and signaling DL CCs and/or UL CCs for the corresponding UE for CoMP measurement report. Alternatively, the measurement report process for the handover can be defined separately from the CoMP measurement report process on the basis of a difference between CoMP and the handover in a target reporting cell or difference between reporting measurement attributes. In this case, the CoMP measurement report process can employ the method for configuring, setting up and signaling CCs, described in the process 2 (S902 of FIG. 9) of the embodiment 1.

As the CoMP mode is set for an arbitrary UE, one of one or more cells in an active cell set on DL CoMP or UL CoMP, which is directly or indirectly involved in transmission and reception, can be set as a target cell in a handover determination process of the serving cell. In this case, downlink transmission of a handover command message, transmission of a (dedicated) PRACH preamble sequence between the target cell and the corresponding UE, and response processes for the transmissions can be eliminated. Furthermore, a CC allocation process (for example, the process 6 of the embodiment 1) for the corresponding UE, which is attended in a frequency aggregation state, can be eliminated. As described above, in a state in which part of the processes exemplified in the embodiment 1 is eliminated, the serving cell can inform the UE that connection with the serving cell is ended through additional RRC signaling or L1/L2 signaling (for example, completion indicator).

When a plurality of DL CCs are set up between the serving cell and the UE, the method of transmitting the handover command message in the embodiment 1 can be applied to a DL CC transmitting the completion indicator. Specifically, upon determination of a handover, the serving cell can transmit a handover request message to the target cell, and the target cell can send a response to the handover request message to the serving cell. In this case, when the serving cell indicates that connection with the serving cell is ended to the corresponding UE through additional RRC signaling or L1/L2 signaling, the UE can recognize the target cell as a serving cell and/or an anchor cell on CoMP right after the indication or from a designated time. A message that indicates that the connection with the serving cell is ended through RRC signaling can be defined in a new message format for LTE-A UEs rather than a handover command message format that is not based on CoMP. When a plurality of DL CCs are set up between the serving cell and the UE, an arbitrary method from among the handover command message transmission methods proposed in the embodiment 1 can be applied.

Alternatively, only the downlink CoMP transmission mode is applied to an arbitrary UE (or only a downlink CoMP active cell set is defined and uplink CoMP operates as UE transparent CoMP), and an arbitrary cell in a downlink active set can be set as a target cell in the handover determination process of the serving cell. At this time, the handover command transmission method and the subsequent processes described in the embodiment 1, and the suggestions with respect to DL CC and UL CC setup can be applied as processes following the handover determination process. In a different manner, a modified handover command message from which information on downlink connection has been eliminated can be considered since downlink transmission connection of the target cell is set up. The modified handover command message may be replaced by a new message in a format different from the handover command message and applied. Subsequently, a process of transmitting a (dedicated) PRACH preamble from the UE to the target cell, a process of receiving a response message for the (dedicated) PRACH preamble, and a process of setting up DL CCs and/or UL CCs for the UE if required can be performed. In addition, at least part of target cell related information for downlink connection setup can be eliminated from a response message to transmission of a (dedicated) PRACH preamble sequence. The above-mentioned method can be applied to even a case in which the downlink CoMP mode in which the active cell set is not signaled to the UE is employed.

Alternatively, only the uplink CoMP transmission mode can be applied (including a case in which downlink CoMP operates as UE transparent CoMP. Here, an uplink CoMP active set may be set or not). The uplink CoMP mode includes a case in which receiving synchronization is made and a case in which receiving synchronization is not made. Basically, application of the handover command message transmission method and the subsequent processes in the embodiment 1 can be considered. If receiving synchronization has been made between the UE and the target cell, (dedicated) PRACH preamble sequence transmission can be eliminated, and thus (dedicated) PRACH preamble resource information can be eliminated from the handover command message. However, it may be desirable to transmit the (dedicated) PRACH preamble sequence for the purpose of inducing a time when the UE is connected with the target cell and a subsequent response message.

In a state in which a CoMP mode is set and DL CC/UL CC setup is achieved, a handover can be implemented according to switching of a reference cell (referred to as a downlink or uplink CoMP anchor cell for convenience) on a downlink and/or uplink transmitting control information in the CoMP mode. Processes for this implementation can be defined as follows.

Process 1: The handover or anchor cell switching is determined on the CoMP anchor cell on the basis of a measurement report result separately triggered based on measurement on CoMP or a variation in RSRP or RSPQ.

Process 2: A target cell or a new anchor cell switching candidate is directed to perform CoMP anchor cell switching, and a message including profile information of the corresponding UE is transmitted from a serving anchor cell to a target CoMP anchor cell (or a target cell, an anchor cell switch candidate). The profile information includes information required to set a new CoMP anchor cell. The profile information is UE-specific information and it can include DL/UL setup information of the corresponding UE.

Process 3: A message including information required for the UE to set the new CoMP anchor cell is transmitted as a response to the process 2 from the target CoMP anchor cell to the serving CoMP anchor cell.

Process 4: Upon reception of the message of the process 3, the serving CoMP anchor cell transmits a CoMP anchor cell switching message to the UE. The methods of configuring, setting up and signaling CCs, exemplified in the process 3 of the embodiment 1, can be applied to the message.

Process 5: Upon reception of the message of the process 4, the UE can transmit an additional ACK/NACK signal for confirming whether or not the message has been correctly received through an uplink control channel or an uplink shared channel, or transmit a (dedicated) PRACH preamble sequence. Resource information for transmitting the ACK/NACK signal or (dedicated) PRACH preamble sequence can be transmitted from the target CoMP anchor cell to the UE through the process 3 and the process 4. Subsequently, the target CoMP anchor cell transmits a message (CoMP anchor cell switching complete message) which indicates that CoMP anchor cell switching is completed to the serving CoMP anchor cell. Upon reception of the CoMP anchor cell switching complete message, the serving CoMP anchor cell cancels its anchor role and connection for the UE so as to complete the overall CoMP anchor cell switching process. If (dedicated) PRACH preamble sequence transmission is performed, a response to the (dedicated) PRACH preamble sequence transmission is additionally transmitted to the UE from the target CoMP anchor cell, and the UE may additionally transmits an ACK/NACK signal before the target CoMP anchor cell generates the CoMP anchor cell switching complete message upon reception of the response from the target CoMP anchor cell. Furthermore, even when the UE transmits a message representing whether or not the message of the process 4 has been correctly received (through an ACK/NACK signal) through the uplink control channel or uplink shared channel, the UE can additionally transmit a downlink ACK/NACK signal for the message before the target CoMP anchor cell generates the CoMP anchor cell switching complete message. The above-mentioned handover process of the UE to which the CoMP transmission mode is applied, and DL CC/UL CC setup and signaling schemes for the handover process are individual schemes, and arbitrary schemes among the individual schemes may be applied in a combined form.

Embodiment 3

Detailed Carrier Aggregation Schemes Relating to a Handover

The following three elements can be considered as carrier aggregation schemes which can be considered in a handover process.

Element 1: Introduction of Extension CC or Frequency Resource Segment

A CC that can perform fundamental connection, cell search and system information transmission processes for a UE on an arbitrary cell, base station or relay node alone can be defined as a stand-alone CC through definition of a physical channel and a physical signal in the same form as LTE Rel-8 carrier. A CC having non-stand-alone property which does not support the above-mentioned processes, different from the property of the stand-alone CC, can be defined as an extension CC. The extension CC does not transmit PSS (Primary Synchronization Signal)/SSS (Secondary synchronization Signal)/P-BCH, and may not transmit a DBCH (Dynamic Broadcast Channel) transferring system information and common PDCCH for the DBCH. In addition, the extension CC may not transmit a DL channel allocation PDCCH and UL grant PDCCH in a format defined at least in the Rel-8 LTE. Accordingly, it is not necessary to set a transmission region of PDCCH defined in the LTE Rel-8 and a CRS (Cell-specific Reference Signal set up in the LTE Rel-8), and as a CFI (Control Format Indicator) indicating them is not needed, there is no need to transmit a PCFICH (Physical Control Format Indicator Channel) defined in the LTE Rel-8. It can be considered that the extension CC has a bandwidth corresponding to scalable BW of the LTE Rel-8. However, the bandwidth of the extension CC can be defined as a bandwidth different from the scalable BW based on purposes such as utilization of specific residual resources. Similarly, as a specific frequency resource region in a CC, a resource region from which the overall particulars described with respect to the extension CC, and some physical channels or physical signals are excluded can be defined as a segment.

Element 2: Cross-CC Scheduling for Carrier Aggregation

When a PDSCH is transmitted from a cell (or a relay node as a transmission subject) to a UE (or a relay node as a receiving subject) through an arbitrary DL CC, a PDCCH (that is, DL channel allocation PDCCH) for scheduling the PDSCH can be transmitted through a DL CC different from the DL CC transmitting the PDSCH. This is defined as downlink cross-CC scheduling or downlink cross-carrier scheduling. Furthermore, when a PUSCH is transmitted from a UE (or a relay node as a receiving subject) to a cell (or a relay node as a transmission subject) through an arbitrary UL CC, a PDCCH (that is, UL grant PDCCH) for scheduling the PUSCH can be received through a DL CC which is not linked with an UL CC transmitting a PUCCH. This is defined as uplink cross-CC scheduling. One or more specific DL CC(s) for transmitting the DL channel allocation or UL grant PDCCH can be set cell-specifically or UE-specifically. This specific DL CC(s) can be referred to as a primary DL CC or anchor DL CC. In addition, one or more specific DL CC(s) for transmitting the DL channel allocation or UL grant PDCCH can be set as a UE-specific or cell (or relay node)-specific PDCCH monitoring CC set.

Element 3: Dynamic/Semi-Static CC Activation/Deactivation

Update of a DL/UL active CC set which is UE (or relay node as a receiving subject)-specifically set, or activation/deactivation of DL CC(s) or UL CC(s) set as the DL/UL active CC set can be dynamically instructed, or whether or not to perform the activation can be semi-statically set using cell (or relay node as a transmission subject)-specific or UE (or relay node as a receiving subject)-specific RRC signaling.

Detailed schemes of a handover process based on the above schemes are suggested as follows.

Handover Process and Operation in Consideration of Introduction of Extension CC or Segment From the standpoint of neighbor cell measurement and report before handover triggering, LTE Rel-8/9 UEs or Rel-10 LTE-A UEs may not perform neighbor cell measurement for an arbitrary extension CC. Furthermore, the extension CC may have different configurations for respective cells (or relay nodes as transmission subjects). In view of this, the following various schemes can be applied.

Scheme 1: The scheme A of the embodiment 1 is assumed. That is, assuming a case in which carrier aggregation is not applied (single DL CC-UL CC) during neighbor cell measurement for a handover. On the assumption that a serving DL CC of a serving cell is an extension DL CC of a neighbor cell, when high priority is set for intra-frequency measurement as in the LTE Rel-8 system, handover triggering to an optimum cell or FA (Frequency Assignment) (CC) may not be performed. When a situation in which an extension CC is cell-specifically configured is assumed, coordination or a special operation for CC configuration can be defined in order to effectively perform neighbor cell measurement. For example, active camping is performed to a specific DL CC configured by the serving cell before neighbor cell measurement is executed for a handover. Furthermore, when a single CC is allocated, a method of allocating a specific DL CC that is cell (or relay node as a transmission subject)-specifically set can be applied. In this case, the corresponding DL CC is a DL CC which is not configured as an extension CC in a neighbor cell (or relay node as a transmission subject) and it can be coordinated in advance when DL CCs are configured. According to this scheme, cell boundary UEs may be concentrated on a specific DL CC so as to bring about high interference. To solve this problem, a plurality of cell (or relay node as a transmission subject)-specifically set DL CCs can be defined. In addition, active camping is performed to a specific DL CC before neighbor cell measurement for the handover is carried out, or a DL CC can be UE (or relay node as a downlink receiving subject)-specifically set when a single CC is allocated. Here, the corresponding DL CC(s) is DL CC(s) which is not configured as an extension CC in a neighbor cell (or relay node as a transmission subject) and can be coordinated in advance when DL CCs are configured. Alternatively, a neighbor cell can inform the UE of information on extension CC configuration prior to neighbor cell measurement. On the contrary, the UE can be informed of information (for example, CC index information) on configuration of measurable DL CCs which are not extension CCs. The CC index information in these two cases can be included in a neighbor cell list as a parameter or defined as an additional parameter, and broadcasted to UEs through the serving cell. This is a method of enabling a network operator to freely configure CCs for each cell and can reduce latency or complexity/expenses of the UE in neighbor cell measurement.

Scheme 2: The scheme B of the embodiment 1 is assumed. That is, it is assumed that carrier aggregation (multi-DL CC setup) is applied to neighbor cell measurement for a handover. When a case in which the overall or some of serving DL CCs of the serving cell are extension CCs of a neighbor cell is assumed, all set DL CCs can be defined as an intra-frequency measurement target in the neighbor cell measurement, and intra-frequency neighbor cell measurement can be performed through a DL CC specifically set or set to a primary or anchor CC. When high priority is set for intra-frequency measurement as in the LTE Rel-8 system, handover triggering to an optimum cell or FA (Frequency Assignment) (CC) may be not performed. On the assumption that an extension CC is cell-specifically configured, coordination or a special operation on CC configuration for enabling the corresponding UE to effectively perform neighbor cell measurement can be defined. For example, when active camping is performed to a specific DL CC or a single CC is allocated before neighbor cell measurement for a handover is performed in a state that a plurality of DL CCs are assigned (active DL CC set is assigned) to a UE, a method of allocating a specific DL CC which is cell (or relay node as a transmission subject)-specifically set can be applied. The specific DL CC can be set by updating the active DL CC set through UE dedicated RRC signaling or PDCCH. In addition, the specific DL CC may be set by leaving only the specific DL CC in an active state and deactivating other DL CCs. In this case, the corresponding DL CC is a DL CC which is not configured as an extension CC in a neighbor cell (or relay node as a transmission subject) and can be coordinated when DL CCs are configured.

According to the present invention, cell boundary UEs may be concentrated on a specific DL CC so as to bring about high interference. To solve this problem, a plurality of cell (or relay node as a transmission subject)-specifically set DL CCs can be defined. In addition, active camping is performed to a specific DL CC before neighbor cell measurement for the handover is carried out, or a DL CC can be UE (or relay node as a downlink receiving subject)-specifically set when a single CC is allocated. Here, the corresponding DL CC(s) is DL CC(s) which is not configured as an extension CC in a neighbor cell (or relay node as a transmission subject) and can be coordinated in advance when DL CCs are configured. Alternatively, a neighbor cell can inform the UE of information on extension CC configuration prior to neighbor cell measurement. On the contrary, the UE can be informed of information (for example, CC index information) on configuration of measurable DL CCs which are not extension CCs. The CC index information can be included in a neighbor cell list as a parameter or defined as an additional parameter, and broadcasted to UEs through the serving cell. This is a method of enabling a network operator to freely configure CCs for each cell and can reduce latency or complexity/expenses of the UE in neighbor cell measurement.

Meantime, a handover command transmission may employ an arbitrary method among the above-mentioned methods. When a handover message is repeatedly transmitted through multiple DL CCs, a method of excluding extension CCs and setting the corresponding DL CCs can be considered as an additional method. In addition, it is possible to consider a method of applying no cross-CC scheduling to handover command message transmission regardless of whether or not the cross-CC scheduling is set. Alternatively, information on an extension CC configured by the target cell can be indicated as a parameter recognizable by the UE in a message (for example, handover command) which represents DL CC configuration information on the target cell. Furthermore, if DL CCs assigned by the target cell to the handover UE includes an extension CC, the extension CC may be indicated as a parameter recognizable by the UE in the handover command message. Another method sets extension CCs for handover UEs through UE (or relay node as a receiving subject)-specific RRC signaling after the overall handover process is completed, and sets DL CCs for a handover command to back-support DL CCs or non-back-support DL CCs as standalone DL CCs different from extension CCs.

Handover Process and Operation in Consideration of Cross-CC Scheduling

In a case in which frequency aggregation (that is, a plurality of DL CCs) is set up by a serving cell or a relay node as a downlink transmission subject and applied during a handover process, cross-CC scheduling can be applied when a handover related message (for example, a handover command message, or a response message to (dedicated) PRACH preamble transmission) is downlink-transmitted. In this case, whether the handover related message will be transmitted through one DL CC or through a plurality of DL CCs needs to be considered. In view of this, detailed methods for downlink-transmitting the handover related message are suggested as follows.

Whether or not to Apply Cross-CC Scheduling to the Handover Related Message

Method 1: Cross-CC scheduling is deactivated at an arbitrary time prior to transmission of the handover related message, and related DL channel allocation PDCCH is transmitted through a DL CC transmitting PDSCH of the handover command message. In this case, the handover command message can be transmitted using a specially set DL CC (for example, a primary or anchor CC) when a plurality of DL CCs are set up. If the handover command message is transmitted through a plurality of DL CCs, DL channel allocation PDCCHs corresponding to a number of PDSCHs need to be generated and transmitted. In this case, the DL channel allocation PDCCHs can be transmitted through the DL CCs transmitting the PDSCHs. Otherwise, DL channel allocation PDCCHs for all the PDSCHs can be transmitted through a specially designated DL CC (for example, a primary CC, or anchor CC). Desirably, one DL channel allocation PDCCH may be transmitted for handover command message (PDSCH) transmission through a plurality of PDSCHs on a plurality of DL CCs in order to avoid PDCCH transmission overhead when the handover command message is transmitted through the plurality of DL CCs. In this case, a DL CC transmitting the DL channel allocation PDCCH may be a specially designated DL CC (for example, a primary CC or an anchor CC).

Method 2: A state in which cross-CC scheduling is continuously activated at a handover command message transmission time can be assumed. In other words, a situation in which a CC indication field is set in a DCI (Downlink Channel Information) format of DL channel allocation PDCCHs for transmission of all PDSCHs including handover command message transmission can be assumed. In this case, it can be considered which DL CC is used to transmit the handover command message. The handover command message can be transmitted through a specific DL CC (for example, a primary CC, or an anchor CC), and the specific DL CC may be a DL CC defined as a DL CC transmitting a PDCCH. Alternatively, the specific DL CC may be a DL CC set in a PDCCH monitoring CC set (if defined). Meantime, when transmission of the handover command message through a plurality of DL CCs is supposed, DL channel allocation PDCCHs corresponding to a number of PDSCHs needs to be generated and transmitted. In this case, the DL channel allocation PDCCHs can be transmitted through DL CCs transmitting the PDSCHs and DL CCs determined according to a cross-CC scheduling rule, that is, a rule for indicating transmission CCs of related scheduling PDSCHs according to a CC indication field in the PDCCHs. Otherwise, DL channel allocation PDCCHs for all the PDSCHs may be transmitted using a specifically designated DL CC (for example, a primary CC or an anchor CC). This case may not conform to the cross-CC scheduling rule. Preferably, one DL channel allocation PDCCH may be transmitted for transmission of a plurality of handover command messages (PDSCH) in order to avoid PDCCH transmission overhead when the handover command message is transmitted through the plurality of DL CCs. In this case, a DL CC transmitting the DL channel allocation PDCCH may be a specifically designated DL CC (for example, a primary CC or an anchor CC).

PDCCH transmission DL CCs of DL scheduling setup and UL grant message, which are configured by the target cell to continuously support cross-CC scheduling during a handover, may be added to physical channel/physical signal receiving DL CC configuration information and physical channel/physical signal transmission UL CC configuration of the UE, contained in the handover command message by the serving cell, and transmitted to the UE. The PDCCH transmission DL CCs may be configured in the same manner as the manner of configuring the primary DL CC described in the present invention. If the UE is well-informed of this fact, the PDCCH transmission DL CCs can be indicated by one parameter signaling for related DL CC configuration.

Whether or not to Apply Cross-CC Scheduling to a Confirmation Message for RPACH Preamble Transmitted from the UE When a plurality of DL CCs is set as an active DL CC set for the UE in the target cell, a confirmation message can be transmitted using the same method as the method of transmitting the handover command message. That is, when a PDSCH carrying the confirmation message is transmitted through one DL CC, the DL CC may be a DL CC linked with an UL CC transmitting a dedicated PRACH preamble, or a specifically designated DL CC (for example, a primary or anchor DL CC) regardless of the UL CC. Meantime, when a plurality of PDSCHs is transmitted through a plurality of DL CCs, cross-CC scheduling may not be applied until the handover process is completed in the target cell and setup through additional RRC signaling is made. That is, a method of transmitting a PDCCH using a DL CC transmitting a PDSCH can be applied. Alternatively, when cross-CC scheduling is activated in the target cell through the handover command message, PDCCHs and related PDSCHs can be independently transmitted through DL CC(s) determined according to the cross-CC scheduling rule. Furthermore, a method of transmitting a confirmation message through PDSCHs on a plurality of DL CCs may be considered. In this case, a method for applying DL channel allocation PDCCHs can employ the detailed schemes described for handover command message transmission.

Handover Process and Operation in Consideration of Dynamic/Semi-Static CC Activation/Deactivation CC setup may be dynamically or semi-dynamically managed in a handover process through CC activation/deactivation based on PDCCH. For example, CC activation/deactivation may be used to designate one or more DL CC(s) which become a measurement target in the active DL CC set during a neighbor cell measurement process. Furthermore, CC activation/deactivation may be used to designate one or more DL CC(s) to be applied to handover command message transmission. For example, when the active DL CC set is configured by M DL CCs, to set N($\leq$M) DL CCs that become a (intra-frequency) neighbor measurement target or N DL CCs used to transmit the handover command message, the remaining (M−N) DL CCs can be deactivated.

When the target cell assigns a plurality of DL CCs to the handover UE through the handover command message, a case in which the target cell wants to use only one or more specific DL CCs before the handover process may be generated. In this case, an explicit parameter for deactivating the remaining DL CC(s) may be transmitted through the handover command message. For example, the UE can recognize DL CC(s) other than a specially designated DL CC (for example, a primary or anchor CC) among DL CCs set through the handover command message to be deactivated.

Figure 10:
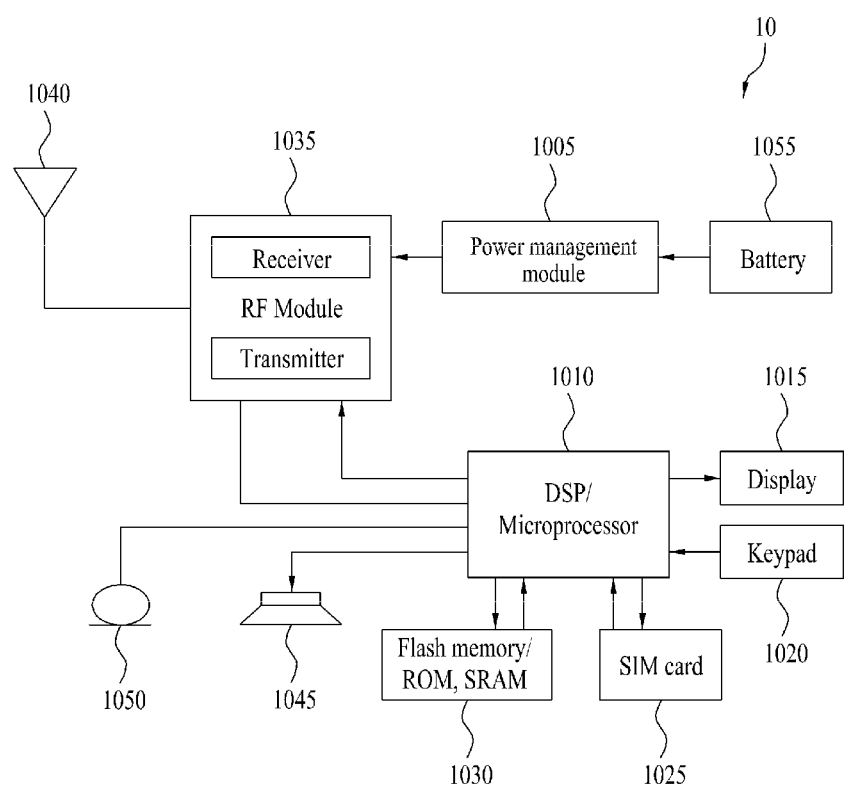
FIG. 10 is a block diagram of a mobile station according to the present invention.

FIG. 10 is a block diagram of the UE 10. The UE 10 includes a processor (or digital signal processor) 1010, an RF module 1035, a power management module 1005, an antenna 1040, a battery 1055, a display 1015, a keypad 1020, a memory 1030, a SIM card 1025 (which may be an option), a speaker 1045, and a microphone 1050.

A user can input information such as a phone number by pressing buttons of the keypad 1020 or by a voice using the microphone 1050. The microprocessor 1010 may receive and process instruction information so as to execute an appropriate function such as dialing the phone number. Operation data may be extracted from the SIM (Subscriber Identifier Module) card 1025 or the memory module 130. Furthermore, the processor 1010 may display instruction and operation information on the display 1015 for reference and convenience of the user.

The processor 1010 provides instruction information to the RF module 1035 to start communication such as transmission of RF signals including voice communication data. The RF module 1035 includes a receiver and a transmitter for receiving and transmitting RF signals. The antenna 1040 facilitates receiving and transmission of RF signals. When an RF signal is received, the RF module 1035 forwards and transforms the RF signal to a baseband frequency for processing by the processor 1010. The processed signal is converted into information that can be heard or read, and output through the speaker 1045, for example. The processor 1010 includes protocols and functions required to perform various processes described in the specification.

The aforementioned embodiments are achieved by combination of elements and features of the present invention in a predetermined manner. Each of the elements or features should be considered selectively unless specified separately. Each of the elements or features may be carried out without being combined with other elements or features. Also, some elements and/or features may be combined with one another to constitute the embodiments of the present invention. The order of operations described in the embodiments of the present invention may be changed. Some elements or features of one embodiment may be included in another embodiment, or may be replaced with corresponding structural elements or features of another embodiment. It is apparent that claims which are not in an explicit quotation relation can be combined to constitute an embodiment and included as a new claim according to amendment after application.

Embodiments of the present invention are explained about data transmission and reception between a base station and a user equipment. In this specification, specific operations performed by the base station may be carried out by an upper node of the base station according to circumstances. In other words, it will be apparent that various operations performed for communication with the mobile station in the network which includes a plurality of network nodes along with the base station may be performed by the base station or network nodes other than the base station. The base station may be replaced with terms such as fixed station, Node B, eNode B (eNB), and Access Point (AP). Also, the user equipment may be replaced with terms such as MS (Mobile Station), MSS (Mobile Subscriber Station), etc.

The embodiments according to the present invention can be implemented by various means, for example, hardware, firmware, software, or combination thereof. In a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The present invention can be applied to a wireless communication system which supports carrier aggregation. Specifically, the present invention can be applied to a method and an apparatus performing a handover.

The invention claimed is:

1. A method for performing a handover at a user equipment (UE) in a wireless mobile communication system which supports carrier aggregation, the method comprising:
transmitting, by the UE to a serving base station, a measurement report for a target base station;
receiving, by the UE from the serving base station, a handover command message,
wherein the handover command message contains allocation information of a plurality of Downlink Component Carriers (DL CCs) available at the target base station, and
wherein one of the plurality of DL CCs is allocated as a primary DL CC; and
transmitting, by the UE to the target base station, a random access preamble via a specific Uplink CC (UL CC),
wherein the specific UL CC is one of UL CCs which are configured at the target base station, and
wherein the specific UL CC is a UL CC paired with the primary DL CC in a frequency division duplex system and the specific UL CC is same as the primary DL CC in a time division duplex system.

2. The method of claim 1, wherein each of the plurality of DL CCs has a respective center carrier.

3. A user equipment comprising:
an RF (Radio Frequency) device; and
a processor operatively connected to the RF device and configured to:
transmit, to a serving base station, a measurement report for a target base station,
receive, from the serving base station, a handover command message,
wherein the handover command message contains allocation information of a plurality of Downlink Component Carriers (DL CCs) available at the target base station, and
wherein one of the plurality of DL CCs is allocated as a primary DL CC, and
transmit, to the target base station, a random access preamble via a specific Uplink CC (UL CC),
wherein the specific UL CC is one of UL CCs which are configured at the target base station, and
wherein the specific UL CC is a UL CC paired with the primary DL CC in a frequency division duplex system and the specific UL CC is same as the primary DL CC in a time division duplex system.

4. The user equipment of claim 3, wherein each of the plurality of DL CCs has a respective center carrier.

5. A method for performing a handover at a User Equipment (UE) in a wireless mobile communication system which supports carrier aggregation, the method comprising:
transmitting, by the UE to a serving base station, a measurement report for a target base station;
receiving, by the UE from the serving base station, handover command messages via first Downlink Component Carriers (DL CCs),
wherein each of the handover command messages has the same allocation information of second DL CCs; and
transmitting, by the UE to the target base station, a random access preamble via a specific Uplink CC (UL CC) linked to a primary DL CC among the second DL CCs,
wherein transmission timings of the handover command messages are staggered by a fixed offset between the first DL CCs, and
wherein each of the first and second DL CCs has a respective center carrier.

6. A user equipment comprising:
an RF (Radio Frequency) module; and
a processor operatively connected to the RF module and configured to
transmit, to a serving base station, a measurement report for a target base station,
receive, from the serving base station, handover command messages via first Downlink Component Carriers (DL CCs),
wherein each of the handover command messages has the same allocation information of second DL CCs, and
transmit, to the target base station, a random access preamble via a specific Uplink CC (UL CC) linked to a primary DL CC among the second DL CCs,
wherein transmission timings of the handover command messages are staggered by a fixed offset between the first DL CCs, and
wherein each of the first and second DL CCs has a respective center carrier.

* * * * *